United States Patent [19]

Kieselbach

[11] Patent Number: 5,604,525
[45] Date of Patent: Feb. 18, 1997

[54] METHOD AND DEVICE FOR REPRODUCING ELECTRONICALLY-STORED DATA USING A LASER-REFLECTING HELICAL THREAD ON A PROM SURFACE

[75] Inventor: Jurgen Kieselbach, Wutha-Farnroda, Germany

[73] Assignee: Rublatex Industrieproducte GmbH, Seebach, Germany

[21] Appl. No.: 289,769

[22] Filed: Aug. 12, 1994

[30] Foreign Application Priority Data

Mar. 4, 1994 [DE] Germany .......................... 44 07 228.7

[51] Int. Cl.$^6$ .................................................. B41J 2/385
[52] U.S. Cl. ............................................................ 347/169
[58] Field of Search ............................... 346/138, 139 R, 346/139 D; 347/259, 260, 110, 169

[56] References Cited

U.S. PATENT DOCUMENTS

| 4,137,538 | 1/1979 | Klein .................................... 347/169 |
| 4,961,080 | 11/1990 | Henderson et al. ..................... 347/260 |

*Primary Examiner*—Benjamin R. Fuller
*Assistant Examiner*—Raquel Yvette Gordon

[57] ABSTRACT

Method and device for reproducing electronically-stored data onto one or more photosensitive layers. The stored data is emitted from a radiation source in the form of one or more parallel beams of electrical signal pulses which are reflected by a moving mirror surface onto the photosensitive layer(s). The invention comprises providing the moving mirror surface in the form of one or more helical walls or elevations present on the surface of a rotating cylinder.

9 Claims, 4 Drawing Sheets

METHOD AND DEVICE FOR REPRODUCING ELECTRONICALLY-STORED DATA USING A LASER-REFLECTING HELICAL THREAD ON A PROM SURFACE

BACKGROUND OF THE INVENTION

1. Field of the Invention

This invention relates to a method for reproducing electronically stored data and an apparatus or reproduction device for performing the method.

2. Description of the Prior Art

Devices of the aforementioned type are known from various applications in data processing technology. For example it is conventional in a laser scanner to utilize pointwise scanning, especially with a beam of light or electrons, a scanning electron microscope, or an electron beam tube. The image is recorded linewise with a scanning head and may be broken up into three color components. It is conducted in the form of electrical signals to the color computer and processed thereby. The output signals of the color computer control the laser, possibly through a modulating unit, with the light of the laser exposing the film with the aid of the write head.

In addition, it is known from digital image conversion, recognition and processing to perform scanning to generate bit patterns associated with the individual points in a grid and containing information on corresponding points of the pattern in digital form. The bit patterns can be processed further in a digital computer, such as for recognition and recoding of writing (characters, alphabets) that are either encoded in turn or are in cleartext. Scanning must be performed at intervals short enough that the reaction to changes in state is sufficiently rapid.

In a known laser scanner, the laser pulses are conventionally deflected by a multisurface facetted mirror, rotating at high speed. The laser beam is deflected many times and focused in a special correcting lens arrangement. Because of the long path lengths and lens errors in the correcting optics that cannot be completely avoided, distortions occur in the imaging of the reflected pulses. In addition, with a slight skew of the rotating mirror, scattering effects can occur that lead to distortion of the imaged pulses, as well as errors that occur in manufacture of mass-produced products and in the transition to simpler designs with a compact form.

In the optical device itself, a lens alignment error is frequently encountered that is responsible for an angle error that results in distortion and unclear images.

The objective of the present invention is to avoid disadvantages and sources of error and to provide a device for reproducing electronically stored data in which the use of an optical correcting device can be eliminated and imaging accuracy can be improved at the same time. The reproducing device is intended to have a design that is as compact as possible, consists of technically simple components, and nevertheless provides high-grade transmission and imaging quality.

SUMMARY OF THE INVENTION

According to the present invention, it has been discovered that exactly parallel and equidistant displacement of pulses, imaged in succession, can be achieved with the method and the device according to the invention, so that the angle of incidence on the photosensitive layer or on a target, is maintained in all positions. This enables the elimination of a correcting lens device which otherwise is required in conventional laser scanning systems.

It is particularly advantageous for the pitch angle of the helical elevation to be 45 degrees. This results in a deflection of the laser beam by 90 degrees, so that perpendicular incidence of the laser beam on the photosensitive material, and hence a high imaging quality over the entire scanner length, is assured.

The helical elevation 1 of helical reflector can be formed for example by a thread disposed in the form of a screw thread on the surface of the cylindrical body. In order to image the reflected beam pulses linewise on the photosensitive material, the cylinder is set rotating so that the deflection of the beam migrates along with the reflection point that is displaced parallel to the axis of the cylinder. Because the conditions remain constant over the entire imaging width, at a pitch angle of 45 degrees and a deflection of 90 degrees, the beams reflected at the reflection point are displaced practically parallel and migrate, corresponding to the rotation of the screw, parallel to the rotational axis of the screw. The deflected laser beam migrates perpendicular to the axis of rotation of the rotating cylinder and scans the photosensitive layer from point A to point B. As a result of this parallel displacement, the angle of incidence on the target is maintained in all positions. In this manner, laser spot deformation, which otherwise necessarily leads to a lack of sharpness of the image because of changes in the angle of incidence, can be avoided.

In designing the effective drum length (scanning length) it is important to keep in mind that the optical radius is always equal to the ratio of the scanning length divided by $2\phi$, with the optical radius being the distance from the laser diode to the scanner drum center. The end point of each scanner path is indicated by a gap in the helical elevation, with the laser beam passing through the gap being detected in suitable fashion. After the beam is detected a signal can be generated to activate a photo drum for example, which is brought into position by a positioning motor or a stepper motor to record the next lines.

Basically it is possible to increase the number of laser beams processed if care is taken to ensure that no interference phenomena occur as a result. It is also possible to increase the rotational speed of the cylinder and thus increase the transmission speed of the reflected laser beams. In addition, simultaneous irradiation of several photosensitive layers is technically feasible, with photosensitive layers of difference colors being irradiated independently of one another, so that multicolor scanning is possible.

The invention will now be described in greater detail with reference to several embodiments.

DETAILED DESCRIPTION OF THE INVENTION

Figure 1:
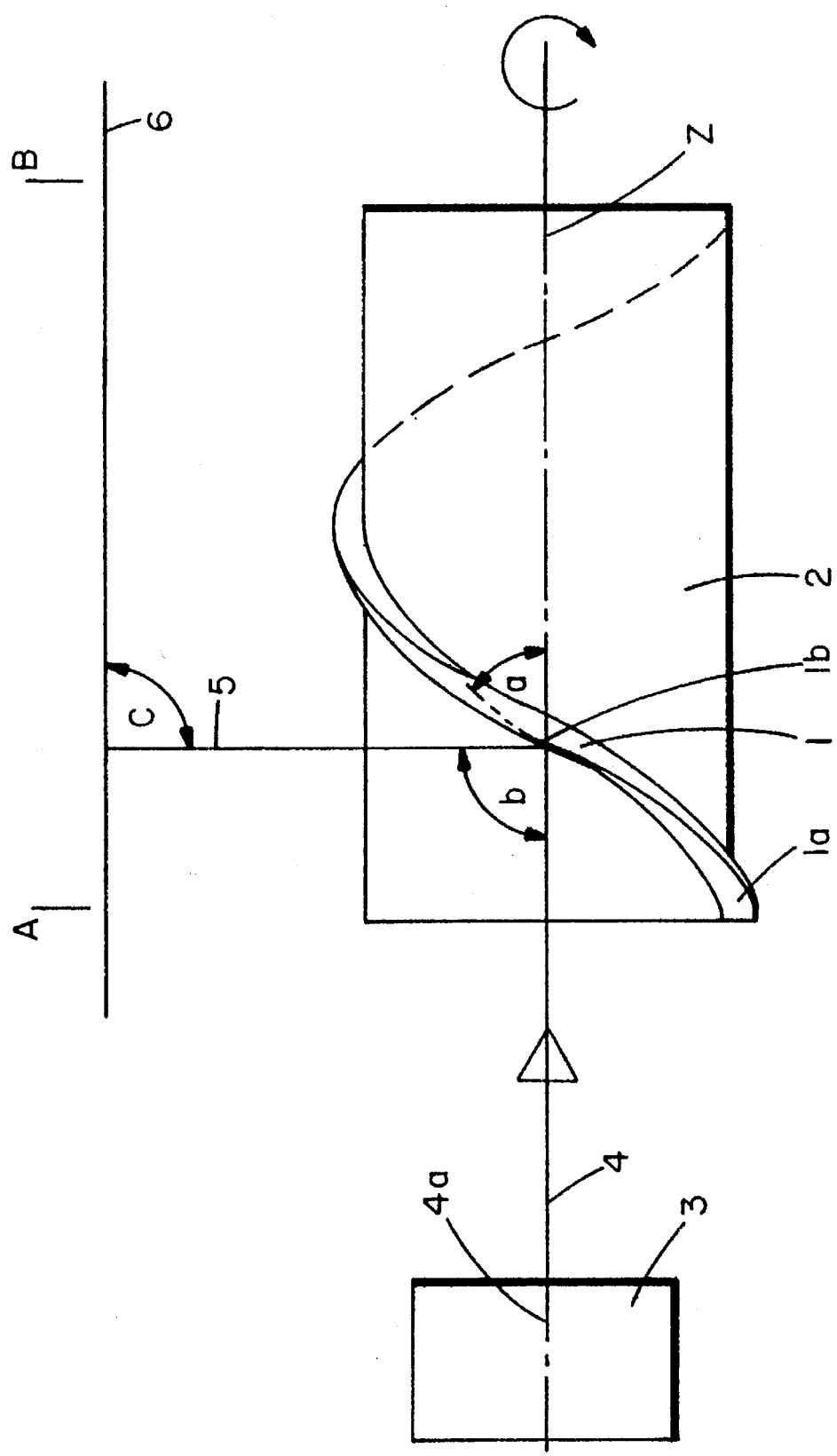
FIG. 1 is a schematic diagram of a side view of a reproduction unit according to an embodiment of the invention.

FIG. 1 shows a helical wall or elevation 1 on a rotating cylinder 2. The beam pulse 4 emitted by a radiation source 3 strikes the mirrored side 1a of helical elevation 1 and is reflected there in the direction of photosensitive material 6. The emitted beam pulse 4 and the reflected beam pulse 5 form a right angle b, while the pitch angle a is measured between section Z passing through the cylinder axis and the tangent drawn at the intersection with the helical elevation.

It is clear from FIG. 1 that reflected beam pulse 5 strikes photosensitive material 6 in its extreme positions at the beginning and end of the helical elevation at points A and B. To determine the end points of scanner path A, B electronically, a gap is provided in helical elevation 1 in such fashion that the end or beginning of the helical path is indicated. This is accomplished by a laser beam passing axially through the gap, without reflection, being detected at the end by a suitable photo-optical unit.

Figure 2:
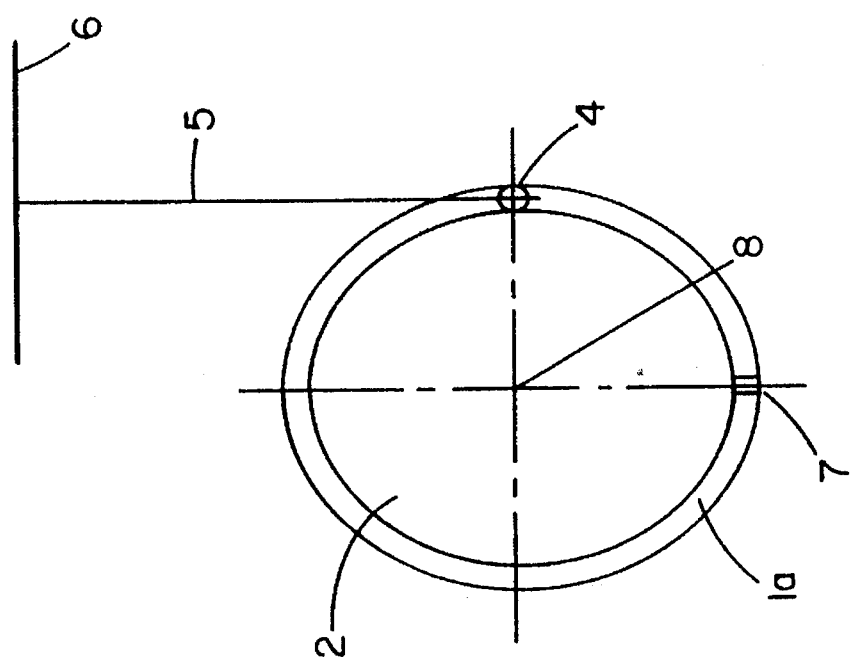
FIG. 2 is a schematic diagram of a unit corresponding to FIG. 1, viewed from a position located transversely with respect to the beam path.

Thus, FIG. 2 shows a cross section view through the reproduction device according to the invention, and shows a gap 7 on side flank 1a of the rotating helical elevation 1. As soon as laser beam 4, emitted by the laser diode, passes through gap 7, it is detected to activate a switch to a new line of photosensitive layer 6. Layer 6 may be present on a rotating outer copy cylinder which is indexed once for each new line and has an axis of rotation which is parallel to that of cylinder 2.

Cylinder 2 rotates around rotational axis 8 with no, or very minor fluctuations in synchronization. Suitable measures are known in precision mechanics to avoid play or inadmissable tolerance in the bearings, so that reflected beam pulse 5 strikes photosensitive layer 6 without distortion. The simple beam path makes correction optics superfluous. This avoids optical errors, for example lens errors, lens distortion, or angle errors. In addition, the design can be kept compact and extremely reliable.

Figure 3A:
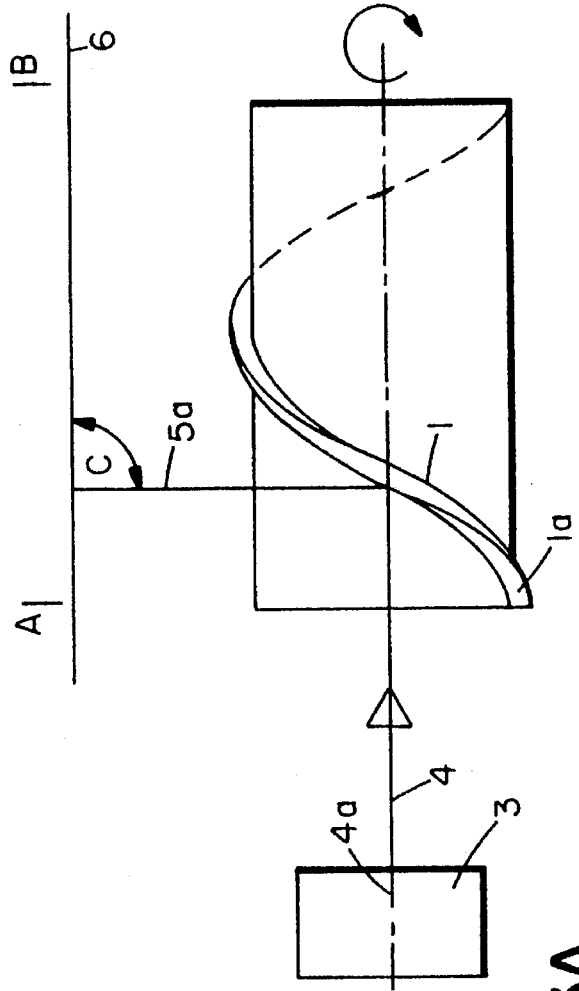
FIGS. 3a and 3b are schematic diagrams illustrating reproduction by reflection at different rotating helical elevation locations.
Figure 3B:
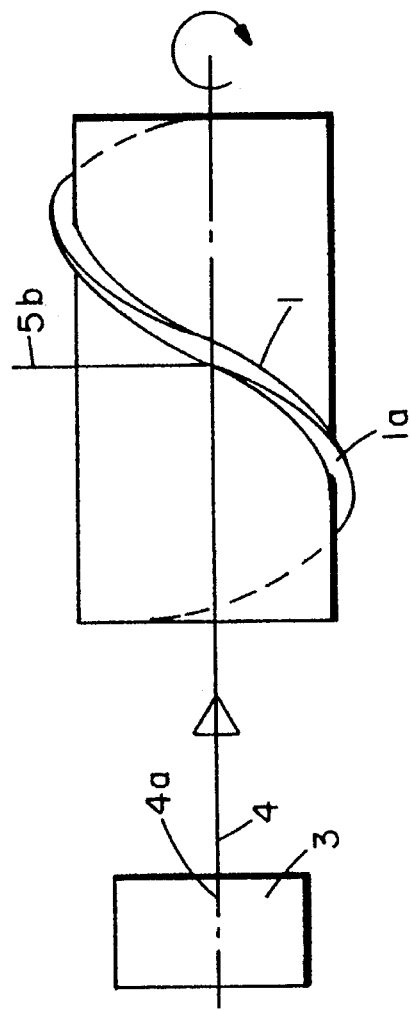

In FIGS. 3a and 3b, the exact axially-parallel displacement of reflected beam pulse 5a, 5b can be seen from the different positions of helical elevation 1 in FIG. 3a and 3b. An important condition for this is that the pitch of the helical elevation must have an angle a=45 degrees. It is also important that the cross section of the helical elevation be rectangular, i.e. reflecting surface 1a must always be perpendicular to emission axis 4a of beam source 3. This ensures that refection point 1b (FIG. 1) always migrates parallel to the rotational axis in correspondence with the rotation of the screw, thus guaranteeing that incidence angle C of reflected beam pulse 5 on photosensitive layer 6 is always 90 degrees.

Figure 4:
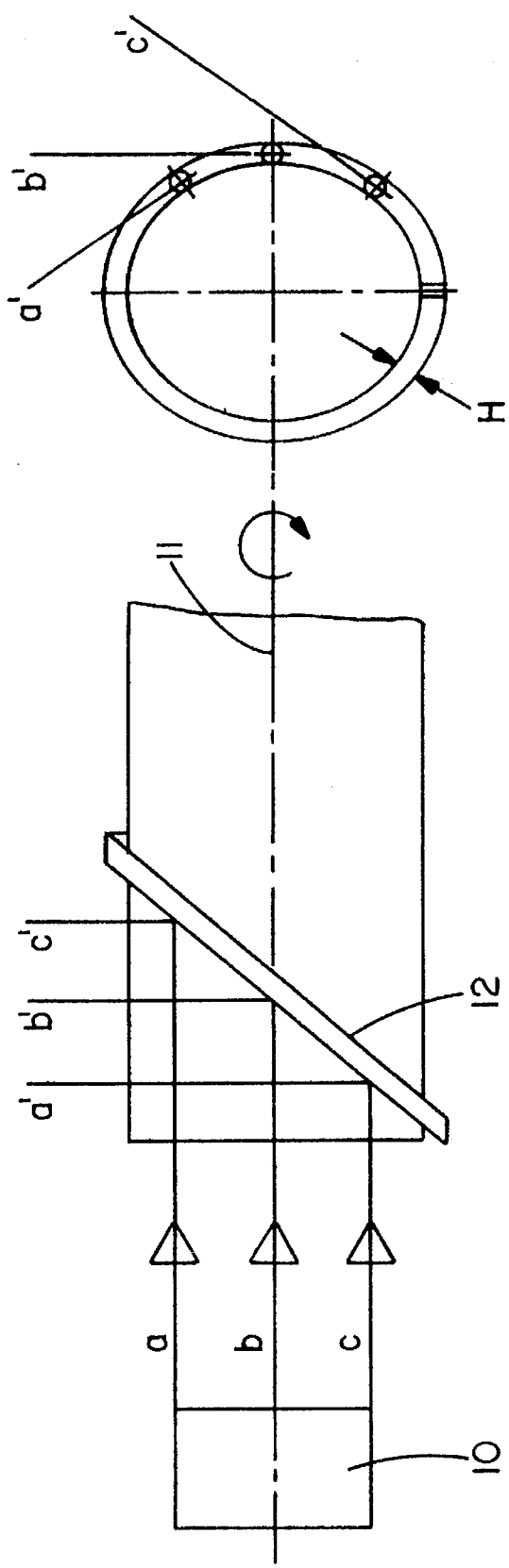
FIG. 4 is a schematic diagram of a multiple reproduction unit.

FIG. 4 illustrates the principle of a multiple scanner. Three different beam pulses a, b, c are emitted from beam source 10 and reflected on helical elevation mirror path 12, inclined at 45 degrees to rotational axis 11. This arrangement enables the speed of the scanner to be increased, and multicolor reproduction to be made possible by simultaneous irradiation of several photosensitive layers.

With the correct location of beam source 10, it is possible to divide up the emitted beams a, b, c in such fashion that they are readily imaged on different photosensitive layers separated spatially from one another, for example targets or other substrates, or even on one or more photo drums. It is evident from this drawing that the reproduction device according to the invention can be readily integrated into existing laser printer systems, laser plotters or photocopiers.

The dimensions of the reflective helical elevation useful according to the present invention are variable within certain limits and can be adjusted to individual applications. In practice, a height of the helical elevation of 0.5 to 1.0 mm has been found to be optimal.

It is also possible to arrange a plurality of helical elevations sequentially on one or more rotating drums. In this case, as viewed from the radiation source, a cylinder with a smaller diameter would be followed by a cylinder or cylinders with increasing diameters. It must be ensured that the emitted beam pulses are directed so that they can strike the corresponding helical elevations. For example, elevations that are further from the beam source must have larger diameters so that they are not blocked or shaded by the preceding elevations, and the beam pulses can sweep them and the mirror surfaces can be struck by the beam pulses and reflected by them.

According to an advantageous embodiment, the reproduction device according to the invention has all successively arranged helical mirrors mounted on a common rotational axis. It is also possible however for the helical mirrors to be on separate axes and to rotate at different rotational speeds, or for the helical elevation 1 to have different slope angles. This depends upon the individual desired type of imaging and the application.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Method for reproducing electronically stored data linewise on a photosensitive layer by means of electrical signal pulses corresponding to said data, which comprises the steps of:

(a) providing a rotating reflector drum having a central axis of rotation and having an outer surface supporting at least one continuous circumferential helical thread having a pitch angle of 45° in elevation thereon, said thread comprising a helical mirror having a reflecting surface which extends in a direction perpendicular to the axis of rotation of the reflector drum;

(b) supporting a photosensitive layer on a rotating copy drum having an axis of rotation which is spaced from and parallel to the axis of rotation of said reflector drum; and (c) directing a radiation source comprising at least one beam of electrical signal pulses, corresponding to said electronically stored data along an emission axis parallel to the axis of rotation of said reflector drum in a direction perpendicular to the direction of extension of said helical mirror to reflect said beam of pulses at a continuously uniform angle of 90° and along a line on said photosensitive layer which extends parallel to the axis of rotation of said reflector drum, directly against said photosensitive layer on said rotating copy drum to scan said layer linewise and reproduce said data on said photosensitive layer.

2. Method according to claim 1 characterized by using a laser diode as the radiation source.

3. Method according to claim 1 characterized by advancing said rotating copy drum one line following each scan of the beam over the entire width of the rotating copy drum.

4. Method according to claim 1 characterized by directing several said beams of electrical signal pulses parallel to one another against spaced areas of the reflecting surface of the helical mirror, and separately reflecting each said beam pulse against a different area of the photosensitive layer.

5. Method according to claim 1 characterized by directing a plurality of said beams of electrical signal pulses spatially separately from each other and reflecting each of said beams against one of a plurality of successive helical mirrors and imaging each of said beams of electrical signal pulses on the photosensitive layer in spaced relation to each other.

6. Device for reproducing electronically stored data linewise on a photosensitive layer by means of electrical signal pulses corresponding to said data, which comprises:

(a) a rotating reflector drum having a central axis of rotation and having an outer surface supporting at least one continuous circumferential helical thread having a pitch angle of 45° in elevation thereon, said thread comprising a helical mirror having a reflecting surface which extends in a direction perpendicular to the axis of rotation of the reflector drum;

(b) a rotating copy drum having an axis of rotation which is spaced from and parallel to the axis of rotation of said rotating reflector drum, and supporting a photosensitive layer thereon; and (c) a radiation source for directing at least one beam of electrical signal pulses, corresponding to said electronically stored data, along an emission axis parallel to the axis of rotation of said reflector drum in a direction perpendicular to the direction of extension of said helical mirror to reflect each said beam of pulses at a continuously uniform angle of 90° and along a line on said photosensitive layer which extends parallel to the axis of rotation of said reflector drum, directly against said photosensitive layer on said rotating copy drum to scan said layer linewise and reproduce said data on said photosensitive layer.

7. Reproduction device according to claim 6 in which said radiation source comprises means for transforming said beam of electrical signal pulses into multiple parallel beams of electrical signal pulses having parallel emission axes, each of which is reflectable at a different area of the reflecting surface of the helical mirror at the same continuously uniform angle to scan and image a different area of the photosensitive layer.

8. Reproduction device according to claim 6 characterized by said rotating reflector drum having a stepped diameter comprising a plurality of drum segments of differed diameters, forming a plurality of outer drum surfaces, each of said drum segments supporting a said helical thread of a different elevation on each of said drum surfaces.

9. Reproduction device according to claim 8 characterized by each said step having a length such that at least one full turn of each helical thread is located on the surface of said rotating reflector drum.

* * * * *

UNITED STATES PATENT AND TRADEMARK OFFICE
CERTIFICATE OF CORRECTION

PATENT NO. : 5,604,525
DATED : February 18, 1997
INVENTOR(S) : Jurgen Kieselbach It is certified that error appears in the above-identified patent and that said Letters Patent is hereby corrected as shown below:

Title page, item [73], Assignee: should read as following:
--Ruhlatec Industrieprodukte GmbH--.

Signed and Sealed this

Sixteenth Day of December, 1997

*Attest:*

BRUCE LEHMAN

*Attesting Officer*     *Commissioner of Patents and Trademarks*